United States Patent
Frank et al.

(10) Patent No.: US 10,810,309 B2
(45) Date of Patent: Oct. 20, 2020

(54) METHOD AND SYSTEM FOR DETECTING KERNEL CORRUPTION EXPLOITS

(71) Applicant: Check Point Advanced Threat Prevention Ltd, Tel Aviv (IL)

(72) Inventors: Dani Frank, Maale Adomim (IL); Yoav Alon, Tel Aviv (IL); Aviv Gafni, Ramat Gan (IL); Ben Omelchenko, Tel Aviv (IL)

(73) Assignee: Check Point Advanced Threat Prevention Ltd, Tel Aviv (IL)

( * ) Notice: Subject to any disclaimer, the term of this patent is extended or adjusted under 35 U.S.C. 154(b) by 0 days.

(21) Appl. No.: 16/571,341

(22) Filed: Sep. 16, 2019

(65) Prior Publication Data

US 2020/0012787 A1    Jan. 9, 2020

Related U.S. Application Data

(63) Continuation of application No. 15/473,654, filed on Mar. 30, 2017, now Pat. No. 10,467,407.

(51) Int. Cl.
```
G06F 21/55      (2013.01)
G06F 21/57      (2013.01)
G06F 21/56      (2013.01)
G06F 9/455      (2018.01)
G06F 9/48       (2006.01)
G06F 21/52      (2013.01)
```
(52) U.S. Cl.
CPC ........ *G06F 21/554* (2013.01); *G06F 9/45558* (2013.01); *G06F 9/4843* (2013.01); *G06F 21/52* (2013.01); *G06F 21/562* (2013.01); *G06F 21/577* (2013.01); *G06F 2009/45587* (2013.01); *G06F 2221/034* (2013.01)

(58) Field of Classification Search
CPC ...... G06F 21/554; G06F 21/52; G06F 21/562; G06F 21/577; G06F 9/45558; G06F 9/4843
USPC ......................................................... 726/23
See application file for complete search history.

(56) References Cited

U.S. PATENT DOCUMENTS

| | | | | |
|---|---|---|---|---|
| 8,042,179 B2 * | 10/2011 | Shoji | ..................... | G06F 11/141 710/52 |
| 10,049,211 B1 * | 8/2018 | Lukacs | ................. | G06F 21/554 |
| 10,146,936 B1 * | 12/2018 | Khanduja | ............. | G06F 21/552 |
| 2012/0047579 A1 * | 2/2012 | Ishiyama | ................ | G06F 21/52 726/23 |
| 2014/0351810 A1 * | 11/2014 | Pratt | ................... | G06F 9/45545 718/1 |
| 2015/0199198 A1 * | 7/2015 | Ven | ..................... | G06F 9/30043 712/205 |

(Continued)

OTHER PUBLICATIONS

NPL: Baliga, Arati, Automated Detection and Containment of Stealth Attacks on the Operating System Kernel, published Jan. 2009.*

(Continued)

*Primary Examiner* — Dant B Shaifer Harriman
(74) *Attorney, Agent, or Firm* — Mark M. Friedman

(57) ABSTRACT

Methods and systems provide for detecting exploitation of kernel vulnerabilities which typically corrupt memory. The methods and systems are implemented, for example, via a host, which includes a hypervisor, which controls the operating system (OS) user space and the OS kernel space.

5 Claims, 6 Drawing Sheets

(56) References Cited

U.S. PATENT DOCUMENTS

2018/0039776 A1* 2/2018 Loman .................. G06F 21/54
2018/0075888 A1* 3/2018 Le Roy .................. G11C 7/22

OTHER PUBLICATIONS

NPL: Gionta, Jason John & Dr. William Enck and Dr. Peng Ning., "Prevention and Detection of Memory Compromise," Sections: 5.4.2-5.5.3., Copyright 2015.*

* cited by examiner

METHOD AND SYSTEM FOR DETECTING KERNEL CORRUPTION EXPLOITS

CROSS REFERENCES TO RELATED APPLICATIONS

This application is a continuation of commonly owned U.S. patent application Ser. No. 15/473,654, entitled: METHOD AND SYSTEM FOR DETECTING KERNEL CORRUPTION EXPLOITS, filed on Mar. 30, 2017, now U.S. Pat. No. 10,467,407, the disclosure of which is incorporated by reference in its entirety herein.

TECHNICAL FIELD

The present invention relates to methods and systems for detecting exploitation of kernel vulnerabilities of the memory corruption type.

BACKGROUND

The kernel is a computer program that constitutes the central core of a computer's operating system. Turning to FIG. 1, the RAM (random access memory) 8 includes an operating system (OS) 10 is divided into kernel space 12 and user space 14. The kernel space 12 is the core of the operating system, and typically has full access to all memory and machine hardware. Only the most trusted code runs in the kernel space 12, also known as the kernel mode. The user space 14 is where typical user programs are run. This user space 14 typically also functions as a sand box (a sandbox is a security mechanism for separating running programs, which is often used to execute untested or untrusted programs or code, possibly from unverified or untrusted third parties, suppliers, users or websites, without risking harm to the host machine or operating system), and restricts user programs from corrupting the memory.

Kernel exploits function to execute code with kernel/supervisor permissions. For example, the exploit employs methods to execute code, running from the kernel mode. These methods include, for example, exploits which execute code from a buffer in the user space memory, for example, a process heap, after changing the memory permissions to executable, from previously unexecutable. Also, the exploits may execute code from executable memory in the kernel space by utilizing ROP (Return Oriented Programming) techniques. ROP is a computer security exploit technique that allows leveraging a sequence of bytes in a memory, which are small pieces of code in a memory already marked as executable. Finally, exploits running from the kernel mode execute code from a non-executable buffer stored in kernel space memory (e.g., memory pool), after changing the memory permissions to executable.

SUMMARY OF THE INVENTION

The present invention provides methods and systems for detecting exploitation of kernel vulnerabilities which typically corrupt memory. The methods and systems are implemented, for example, via a host, which includes a hypervisor, which controls the operating system (OS) user space and the OS kernel space. The host, e.g., hypervisor, is OS agnostic, such that the invention is used with operating systems such as Windows® 32 bit/64 bit, Linux® and OSX. The present invention protects the operating system (OS) and can run on server and network end points.

Embodiments of the invention are directed to a computerized method for mitigating exploitation of kernel vulnerabilities. The method comprises: providing a host to a memory system, the memory system comprising a guest user space and a guest kernel space; and, the host responsive to attempts to exploit a Central Processing unit (CPU) security feature from the guest user space, the host configured to control the logic for the guest kernel space, upon receiving an indication of an attempt to exploit the CPU security feature, the host controlling the logic including rendering the guest kernel space transparent to exploitation attempts to the guest user space.

Optionally, the computerized method additionally comprises: detecting an exploit at the guest user space which defines an indication of an attempt to exploit the CPU security feature, and, the host controlling the guest kernel space to enable the protection system associated with the guest kernel space.

Optionally, the method is such that the CPU security feature includes an SMEP (Supervisor Mode Execution Protection/Prevention) bit of a CR4 register, and, the attempt to exploit the SMEP bit includes an attempt to change a value in the CR4 register.

Optionally, the method is such that the attempt to change a value in the CR4 register includes an attempt to READ or WRITE in the CR4 register.

Optionally, the method is such that the host controlling the logic additionally includes the host sending a false value to the memory system, causing the SMEP bit to remain enabled.

Optionally, the method is such that upon receiving the indication of the attempt to exploit the SMEP bit, the host reports the attempt to exploit the SMEP bit as a security violation.

Optionally, the method is such that the host includes a hypervisor.

Other embodiments of the invention are directed to a computerized method for detecting malicious code from executable memory in the kernel space. The method comprises: providing a host, for example, a hypervisor, for a virtual memory system, the memory system comprising a guest user space and a guest kernel space, the host managing a branches buffer for each process operating in the memory system; analyzing, by the host, instructions for a process in a CPU buffer associated with the memory system; searching, by the host, for exploitation patterns in the instructions for the process, in the branches buffer; analyzing the exploitation patterns against predetermined malicious or potentially malicious patterns, to determine whether the exploitation patterns from the instructions is malicious or potentially malicious, and, if the exploitation pattern is malicious, issuing an alert for the exploitation pattern.

Optionally, the analyzing, by the host, instructions for a process in a CPU buffer associated with the memory system includes searching for branches with calls (CALL) and Returns (RET), and the searching resulting in a RET being found.

Optionally, the searching, by the host, for exploitation patterns in the instructions for the process, in the branches buffer, includes searching for a corresponding CALL for the RET which was found.

Optionally, the analyzing the exploitation patterns against predetermined malicious or potentially malicious patterns, to determine whether the exploitation patterns from the instructions is malicious or potentially malicious, includes determining that a corresponding CALL for the RET which was found has not been found, such that a malicious or potentially malicious pattern has been detected.

Other embodiments of the invention are directed to a computerized method for detecting attempts of code execution from memory pages from non-executable memory in the kernel space. The method comprises: providing a host, for example, a hypervisor, for a memory system, which is for example, virtual, the memory system comprising a guest user space and a guest kernel space, the host managing a branches buffer for each process operating in the memory system; writing, by the host, a shadow page table entry for a memory page, the shadow page table entry (SPTE) describing a guest address; determining that the guest address is a kernel mode address; determining whether the kernel mode address is an executable kernel address; and, if the kernel mode address is an executable kernel address, disable a NX bit in the SPTE so that the code executes; and, if the kernel mode address is not an executable kernel address, enable the NX bit in the SPTE, so that the code is non-executable.

Optionally, the computerized method is such that the determining whether the kernel mode address is an executable kernel is performed by checking the kernel mode address against addresses in a white list.

Optionally, the computerized method is such that it additionally comprises: when the NX bit in the SPTE has been enabled, determining whether the kernel mode address is a kernel address, and if the kernel mode address is a kernel address which is not a predetermined address, report the kernel mode address as malicious or potentially malicious.

Optionally, the computerized method is such that predetermined addresses are provided in a white list.

This document references terms that are used consistently or interchangeably herein. These terms, including variations thereof, are as follows.

Throughout this document, a "web site" is a related collection of World Wide Web (WWW) files that includes a beginning file or "web page" called a home page, and typically, additional files or "web pages." The term "web site" is used collectively to include "web site" and "web page(s)."

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

Figure 1:
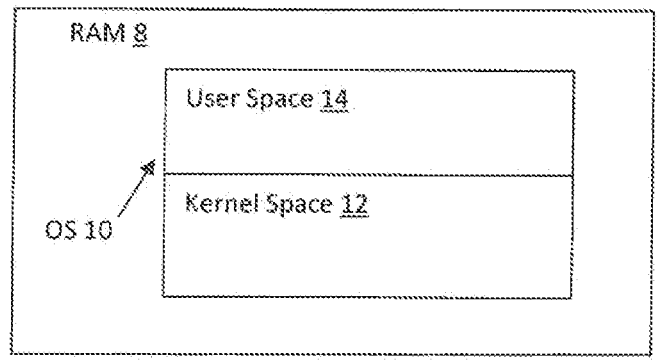
FIG. 1 is a diagram of a conventional RAM.

Table 1 follows the drawing figures.

DETAILED DESCRIPTION OF THE DRAWINGS

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

The present invention provides methods and systems for detecting exploitation of kernel vulnerabilities which typically corrupt memory. The methods and systems are implemented, for example, via a host, which includes a hypervisor, which controls the operating system (OS) user space and the OS kernel space. The host, e.g., hypervisor, is OS agnostic, such that the invention is used with operating systems such as Windows® 32 bit/64 bit, Linux® and OSX. The invention is also used in container environments, where for example, the same kernel space associated with the memory is used, with a different guest user space. The present invention protects the operating system (OS) and can run on server and network end points.

Figure 2:
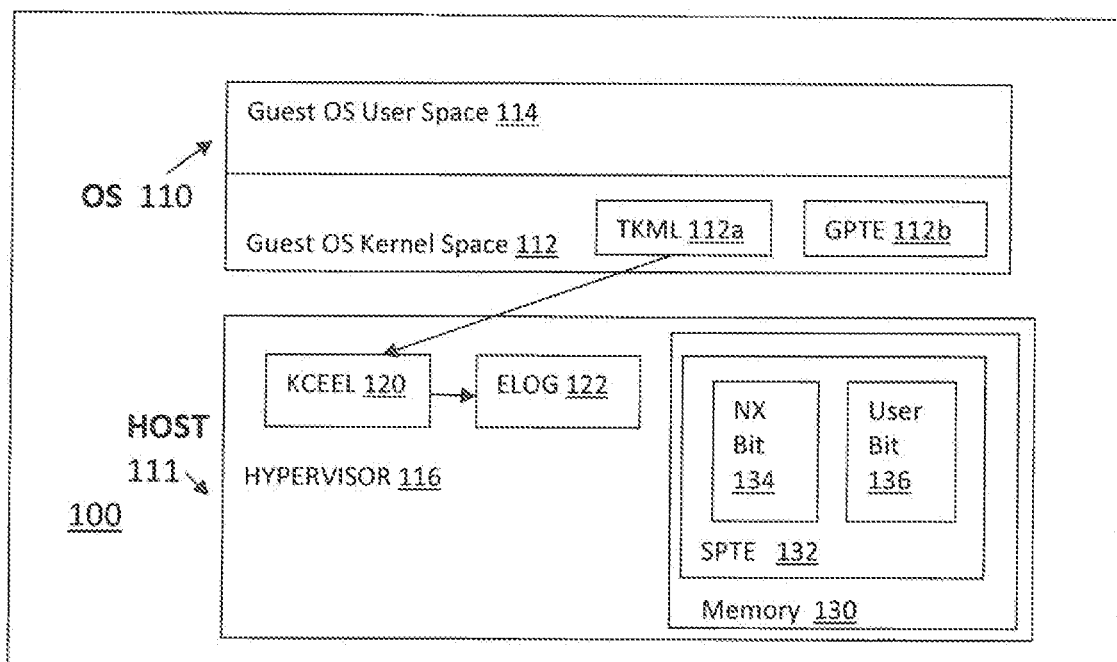
FIG. 2 is a diagram of a system in accordance with embodiments of the present invention.

FIG. 2 details and exemplary system 100 in accordance with the present invention. The system 100 is located, for example in memory such as RAM. Within the RAM is an operating system (OS) 110, which is of a virtual machine, formed of components including guest OS Kernel Space 112 and guest OS user space 114. A host 111, runs a hypervisor, 116, which is also part of the system 100 and links to the OS 110, in order to control the guest OS Kernel Space 112 and the Guest OS User Space 114, in a manner transparent to the guest OS Kernel Space 112 and guest OS user space 114.

The guest OS kernel Space 112, includes a trusted kernel modules logger (TKML) 112a, which operates as an agent inside the guest OS kernel space 112, and which logs kernel modules that are trusted, such as kernel drivers, in order to generate white listed addresses for trusted code execution in the guest OS kernel space 112. The TKML 112a also is used to assist translation of guest addresses to the opcode (operational code) that resides in a particular guest address. The guest OS kernel space 112 also includes a guest page table entry (GPTE) 112b. The GTPE 112b includes various guest addresses, which are, for example, described by the hypervisor 116 when it attempts to write a corresponding shadow page table entry (SPTE) into the virtual memory. The hypervisor 116 maps Guest Page Table Entries (GPTEs) 112b to Shadow Page Table Entries (STPEs) 132.

The hypervisor 116 includes a kernel code execution enforcement logic (KCEEL) module 120. This module 120 is where the logic for the hypervisor 116 is implemented. The KCEEL module 120 is linked to the TKML 112a. The KCEEL 120 links to an events logger (ELOG) 122, for logging security violation events, as detected by the hypervisor 116. There is a memory section 130 or memory, which, for example, includes a Shadow Page Table (SPTE) 132. The SPTE 132 includes a NX bit 134, for allowing execution of memory pages in the kernel memory 130, the memory pages translated by the hypervisor 116 from those of the GPTE 112b, and a User Bit 136. The user bit 136 controls the user mode and the kernel mode and is associated with an address that is in either the user space or the kernel space of the virtual memory, and has an SPTE 132 describing a kernel address or a user address in the virtual memory. The hypervisor 116 maps the memory in the guest 110 to the memory in the host 111, and attempts to synchronize the memory between the GPTE 112b and the SPTE 132.

User Space Memory

In order to detect execution of code that resides in the guest OS user space 114 by the code running in kernel mode, a CPU security feature such as Intel SMEP (Supervisor Mode Execution Protection/Prevention) would be used. SMEP prevents execution of a code located on a user-mode page (for example, at a CPL=0). SMEP complicates an exploitation of kernel-mode vulnerabilities because there is no place for shellcode storage. Shell codes are typically used in exploits for kernel-mode vulnerabilities, where attackers typically allocate a special user-mode buffer with a shellcode, and then trigger vulnerabilities, gaining control of the execution flow and overriding it to execute prepared buffer contents.

SMEP is a part of a page-level protection mechanism. In fact it uses the already existing flag of a page-table entry the U/S flag (User/Supervisor flag, bit 2). This flag indicates whether a page is a user-mode page, or a kernel-mode. The page's owner flag defines if this page can be accessed, that is, if a page belongs to the OS kernel which is executed in a supervisor mode, the page cannot be accessed from a user-mode application.

The SMEP (or equivalent CPU security feature) is enforced from the hypervisor 116, regardless of how the OS 110 of the guest is running. Since the SMEP enforcement takes place in the hypervisor 116 the exploit's attempts of disabling the SMEP would be ineffective.

Figure 3:
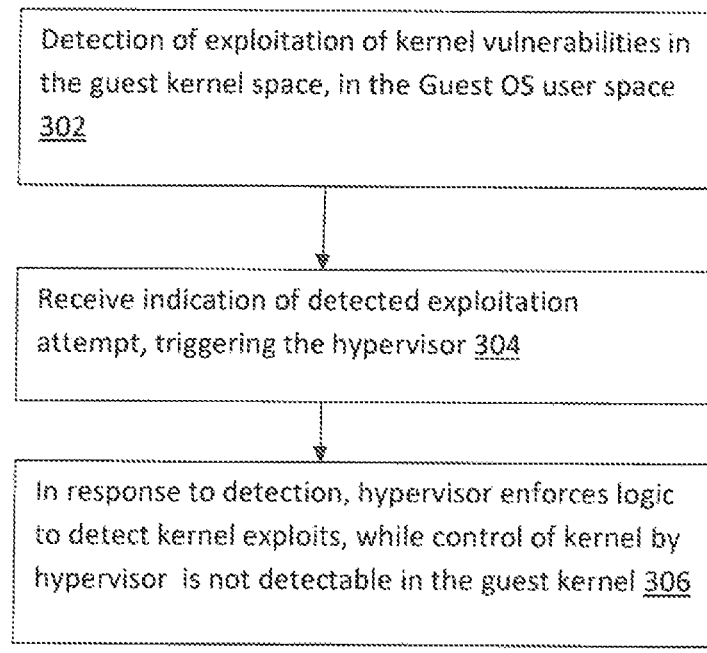
FIG. 3 is a flow diagram of a first embodiment for performing exploit detection.

For example, as shown in the flow diagram of FIG. 3, there is a generalized process in accordance with the present invention, involving the system 100 of FIG. 2. The flow diagram includes, for example, processes and sub-processes, which can be, for example, performed manually, automatically, or a combination thereof, and, for example, in real time.

At block 302, the exploitation event of kernel vulnerabilities in the guest OS Kernel space is detected in guest OS user space 114. The exploitation event would be detected when an exploit tries to execute code in the guest OS user space 114. For example, the exploit attempts to READ/WRITE into the CR4 register of the control registers (which are, for example, processor registers which changes or controls the general behavior of the CPU), to control the SMEP, for example, attempting to disable it from the guest OS 110. The control registers are processor registers which change or control the general behavior of the CPU. The CR4 register is used, for example, in protected mode, to control operations, such as virtual CPU support and machine check exceptions, and includes a bit, for example Bit 20 in Table 1, the SMEP bit, for an example CR4 Register. SMEP is enabled or disabled the via CR4 control register (Bit 20).

SMEP slightly modifies the influence of the U/S flag. Whenever the supervisor attempts to execute a code located on a page with the U value of this flag, indicating that this is a user-mode page, a page fault is generated by the hardware due to the violation of an access right. Access rights are defined, for example, in *Intel® 64 and IA-32 Architectures Developer's Manual: Combined Volumes*, Vol. 3A Chapter 4.6, Intel Corporation, 2011.

The process moves to block 304, where upon receiving an indication of a detected exploitation attempt, e.g., an attempt to READ or WRITE (change a value) in the CR4 register, to control the SMEP, the hypervisor 116 is triggered. The process moves to block 306, where the hypervisor 116 activates the logic necessary to keep the guest OS kernel space 112 operating in its normal manner. For example, the hypervisor 116 sends a false value to the guest OS user space 114, keeping the SMEP enabled, even though the exploit continues to execute as if the SMEP were disabled. Once triggered, the hypervisor 116 runs the logic for the guest OS kernel space 112, which is not detectable and thus, transparent to the guest OS user space 114, where the exploit is attempting to execute. Once the SMEP violation (e.g., attempt to control the SMEP) has been triggered, the ELOG 122 would trap the CPU interrupt and report an alert of malicious activity.

Executable Memory in the Kernel Space

Figure 4A:
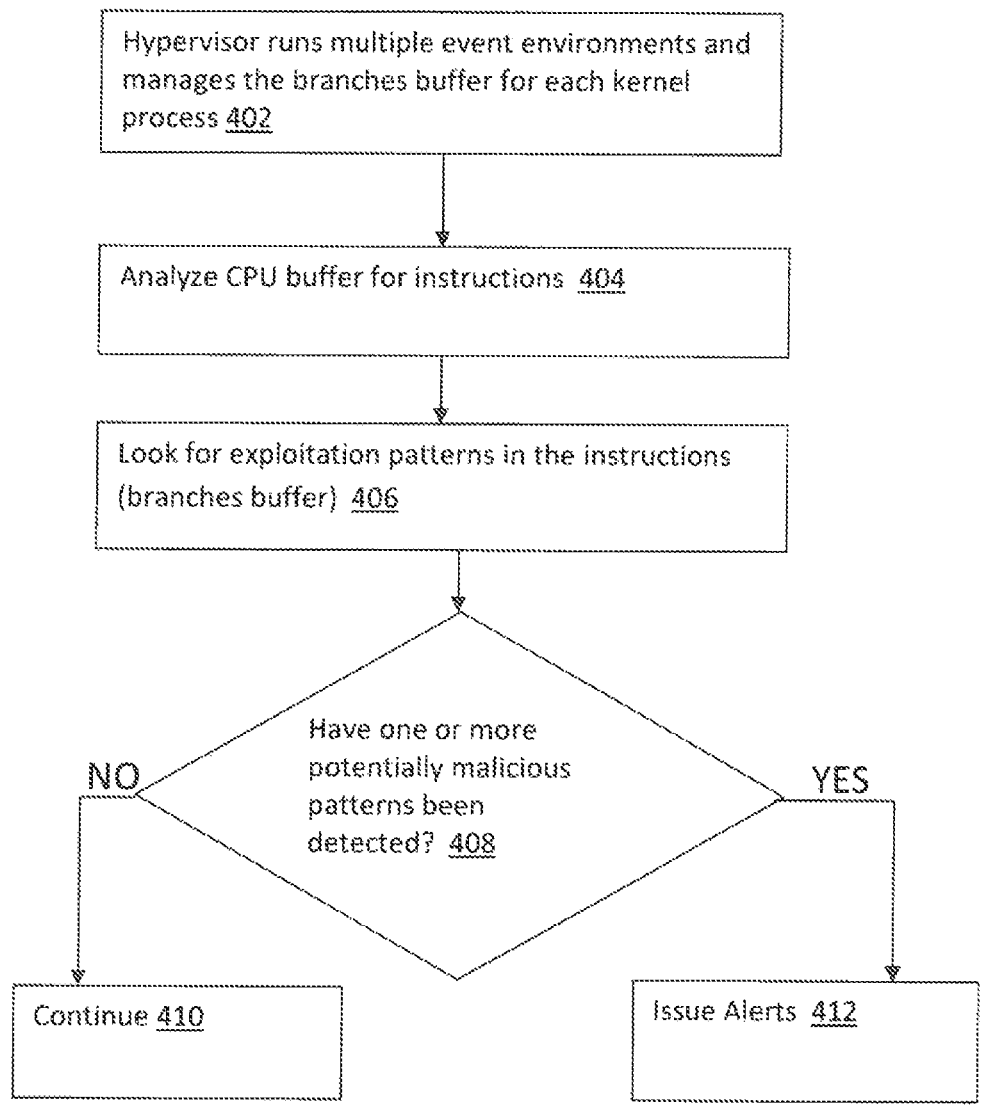
FIGS. 4A and 4B are flow diagrams for hypervisor operation on executable memory in the kernel space.

By configuring the debugging CPU feature (e.g., Branch Trace Source (BTS), Last Branch Record (LBR), Intel Processor Tracing (PT), Architecture Event Trace (AET), and other Hardware-assisted debug tools with trace capability) from the hypervisor 116 in the mode of logging kernel branches, for each guest OS, the branches would be logged into circular buffer resided in RAM that would later be analyzed. Turning to FIG. 4A, the hypervisor 116 runs multiple event environments and manages the branches buffer for each kernel process, at block 402. At block 404, the CPU buffer is analyzed for instructions, as the KCEEL 120 first translates the logged branch addresses (assuming they in format of "from" and "to" but not limited thereto) to the opcode type that resides in that address. In order to perform the translation, KCEEL 120 can query TKML 112a per each address and maintain internal cache. Another option is to perform an offline scraping of all kernel modules from the guest and build a database that can be queried by the KCEEL 120 in order to translate the virtual addresses to opcode types. Next, at block 406, the hypervisor 116 looks for exploitation patterns in the instructions (the branches buffer). The process moves to block 408, where it is determined whether one or more potentially malicious patterns have been detected. If no, the process moves to block 410, from where it continues. If yes, the process moves to block 412, where an alert is issued.

Figure 4B:
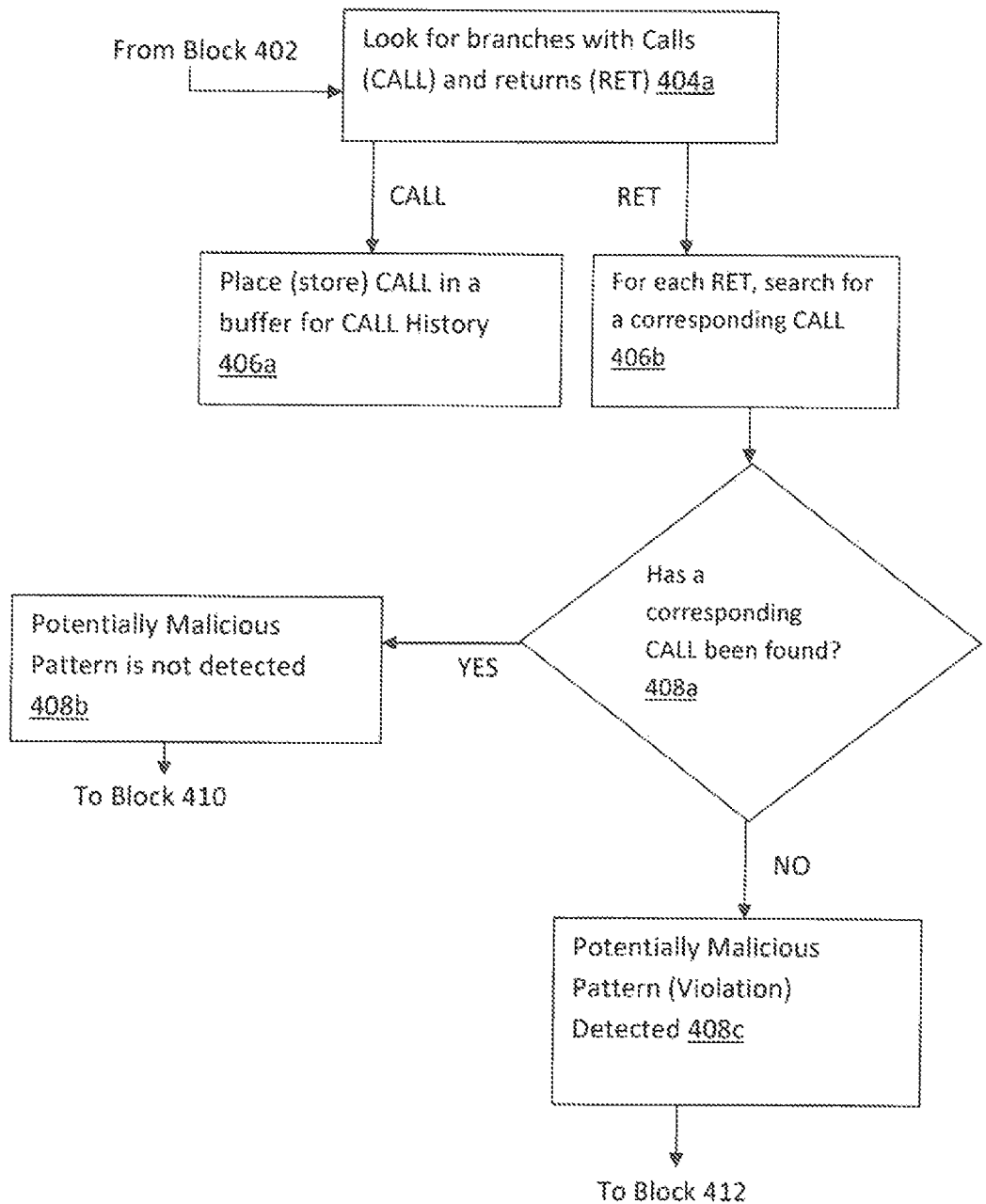

FIG. 4B includes blocks 404a, 406a, 496b 408a, 408b and 408c, which show an example operation of the general process of FIG. 4A. In the process of FIG. 4B, after block 402 (detailed above for FIG. 4A), the process moves to block 404a, where the system looks for branches with calls (CALL) and returns (RET). Also at block 404a, where after having the addresses and the related operational code (known as "opcode") types, a Return Oriented Programming (ROP) detection algorithm is applied. At block 406a, when a CALL is detected, it is placed in a buffer for CALL history. At block 406b, ROP detection includes validation that for every "RET" opcode, the "to" address points to opcode that occurs right after a corresponding "CALL" opcode that was executed in the past. From block 406b, the process moves to block 408a, where it is determined whether a corresponding CALL opcode has been found for the particular RET. In case this condition is met, the process moves to block 408b, where a potentially malicious pattern is not detected, and the process continues from block 410 of FIG. 4A. In case this condition is not met, a ROP is detected in kernel and reported to ELOG 122 by the KCEEL 120, at block 408c. The process continues from block 412 of FIG. 4A.

Non-Executable Memory in the Kernel Space

In this embodiment of the system 100, attempts of code execution from kernel space memory pages that were not intended to have execution permissions, are detected. The hypervisor 116 fully controls the ranges of executable memory by whitelisting the memory pages that are allowed for execution such as driver modules. Virtualization features of the CPU are utilized to control and monitor memory permissions and the execution state.

Figure 5:
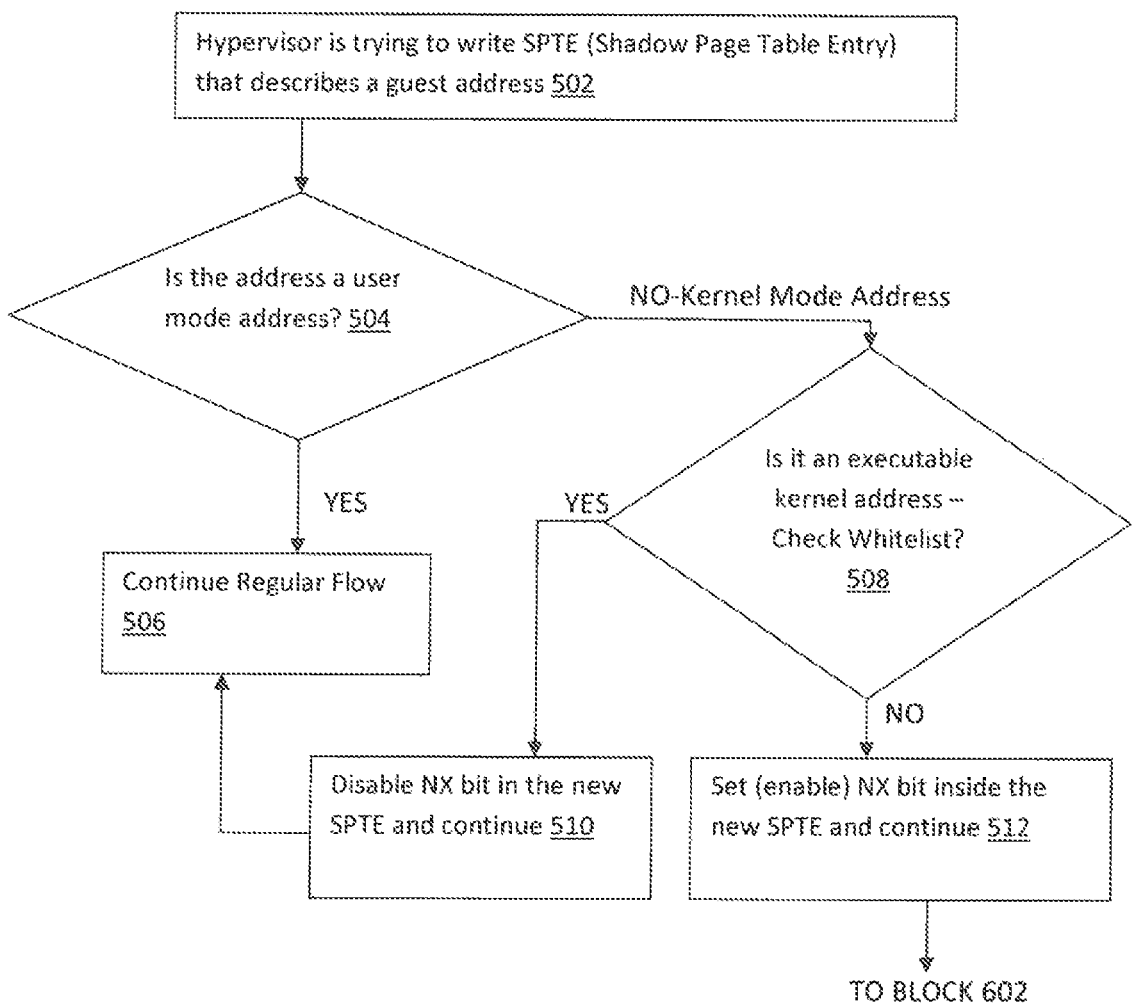
FIG. 5 is a flow diagram of hypervisor operation with detection of shadow page table entries; and, FIG. 6 is a flow diagram of a process triggered by a potential exploitation of the kernel.

As shown in FIG. 5, the process detailed herein is performed by the hypervisor 116, in order to modify SPTEs to change the permissions (e.g., NX bits 134) of the SPTE 132 to detect potential exploits of kernel memory addresses. Beginning at block 502, the hypervisor is trying to write a Shadow Page Table entry (STPE) that describes a guest address. At block 504, it is determined whether the address is a user mode address. If yes, the process moves to block 506, where regular flow continues. If no at block 504, the address is a kernel mode address, and the process moves to block 508, to determine whether the kernel address is an executable address, which can be exploited.

At block 508, a white list is checked, to determine whether the address is an executable kernel address. If yes, at block 508, the process moves to block 510, where the NX bit 134 is disabled in the new SPTE 132 in the hypervisor 116, and the flow continues, by the process moving to block 506. At block 510, the hypervisor 116 has modified the NX bit 134 for this particular address in the kernel space. If no, the process moves to block 512, where the NX bit 134 is set or enabled in the new SPTE 132 in the hypervisor 116, and the flow moves to block 602 (of FIG. 6). At block 512, the hypervisor 116 makes the particular address in kernel space non-executable.

Figure 6:
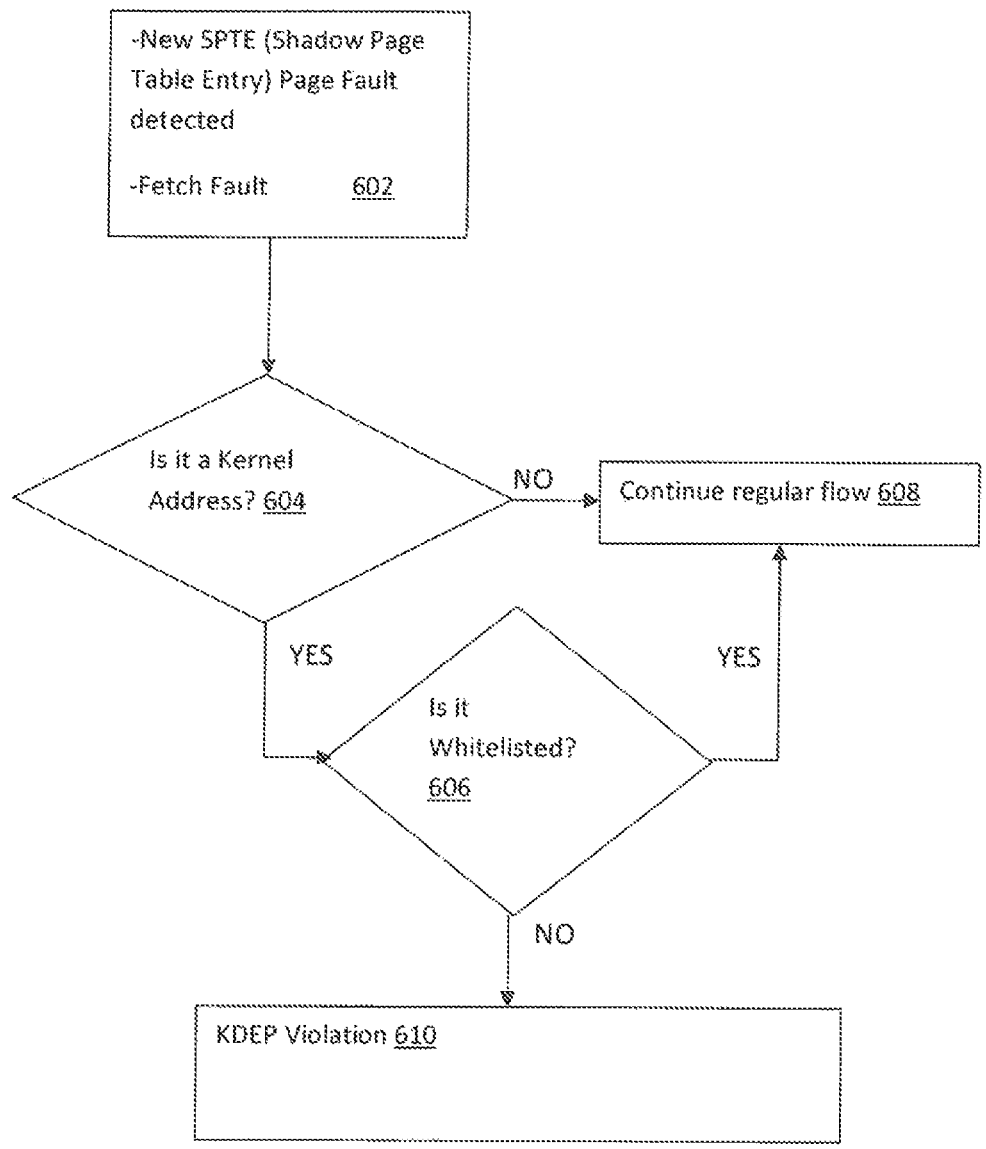

Turning also to FIG. 6, from block 512, the process moves to block 602. In FIG. 6, there is shown an exemplary process for detecting kernel exploitation.

Initially, at block 602, a new STPE (Shadow Page Table Entry) page fault is detected. A "page fault" includes, for example, an exception raised by computer hardware when a running program accesses a memory page that is not currently mapped by the memory management unit (MMU) into the virtual address space of a process. Should the page fault be a fetch fault, which occurs when the CPU fails to run a command, the process moves to block 604. At block 602, a new STPE (Shadow Page Table Entry) page fault is detected. Should the page fault be READ/WRITE request, the process moves to block 508, from where the regular flow continues.

Returning to block 604, should the page fault not map to a kernel address, the process moves to block 608, from where the regular flow continues. If yes, at block 604, the process moves to block 606, where it is determined whether the kernel address is white listed.

The whitelisting contains the following memory areas: 1) Loaded drivers' executables sections—for example, in Windows finding all loaded drivers can be achieved by using the undocumented windows API Nt Query System Information with the flag System Process Information; 2) IO (Input/Output) mapped memory; and 3) Device memory such as GPU buffers. The whitelist is built once the system is loaded and is being updated during the guest lifetime by adding or removing ranges according to TKML reports.

If white listed, at block 606, the process moves to block 608, from where it continues as regular flow, as detailed above. If not white listed, at block 606, a KDEP violation is reported at block 610.

Execution control is mitigated through the NX bit on kernel memory pages. Every page that is not in the whitelist is set as non-executable. The NX bit is set in host (hypervisor 116) page table entries (PTE) without affecting the guest OS. If a code from such page is later being executed, a page fault is triggered and the host (hypervisor) gets notified. This page fault, assuming the whitelist is correct, is a malicious activity of kernel code execution in the guest. The malicious activity is reported by the ELOG 122.

The implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computerized method for mitigating exploitation of kernel vulnerabilities, comprising:
   providing a host to a memory system, the memory system comprising a guest user space and a guest kernel space; and,
   the host responsive to attempts to exploit a Central Processing unit (CPU) security feature from the guest user space, the host controlling the logic for the guest kernel space, upon receiving an indication of an attempt to exploit the CPU security feature, the host controlling the logic includes: 1) rendering the guest kernel space transparent to exploitation attempts to the guest user space, and, 2) the host sending a false value to the memory system, causing the SMEP bit to remain enabled, and, the CPU security feature including an SMEP (Supervisor Mode Execution Protection/Prevention) bit of a CR4 register, and, the attempt to exploit the CPU security feature including the SMEP bit includes an attempt to change a value in the CR4 register.

2. The computerized method of claim 1, additionally comprising: detecting an exploit at the guest user space which defines an indication of an attempt to exploit the CPU security feature, and, the host controlling the guest kernel space to enable the protection system associated with the guest kernel space.

3. The computerized method of claim 1, wherein the attempt to change a value in the CR4 register includes an attempt to READ or WRITE in the CR4 register.

4. The computerized method of claim 1, wherein upon receiving the indication of the attempt to exploit the SMEP bit, the host reports the attempt to exploit the SMEP bit as a security violation.

5. The computerized method of claim 4, wherein the host includes a hypervisor.

* * * * *